(12) United States Patent
Schulz et al.

(10) Patent No.: US 6,568,862 B2
(45) Date of Patent: May 27, 2003

(54) COUPLING DEVICE FOR CONNECTING AN OPTICAL FIBER TO AN OPTICAL TRANSMITTING OR RECEIVING UNIT AND TRANSMITTING OR RECEIVING DEVICE HAVING A COUPLING DEVICE

(75) Inventors: Klaus Schulz, Berlin (DE); Jörg Kropp, Berlin (DE); Jens Stephan, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/012,814

(22) Filed: Oct. 30, 2001

(65) Prior Publication Data

US 2002/0076171 A1 Jun. 20, 2002

(30) Foreign Application Priority Data

Dec. 20, 2000 (DE) .......................... 100 64 959

(51) Int. Cl.⁷ ................................. G02B 6/36
(52) U.S. Cl. ...................... 385/88; 385/90; 385/92; 385/14
(58) Field of Search ............... 385/88–94, 14, 385/15

(56) References Cited

U.S. PATENT DOCUMENTS

| | | |
|---|---|---|
| 4,097,891 A | 6/1978 | Selway et al. |
| 4,874,217 A | 10/1989 | Janssen ........................ 385/88 |
| 5,696,862 A * | 12/1997 | Hauer et al. ................... 385/88 |
| 6,374,021 B1 * | 4/2002 | Nakanishi et al. ............. 385/49 |

FOREIGN PATENT DOCUMENTS

| | | |
|---|---|---|
| EP | 0 726 477 A2 | 8/1996 |
| EP | 0 874 258 A1 | 10/1998 |
| JP | 62003211 | 1/1987 |
| JP | 63253315 | 10/1988 |

OTHER PUBLICATIONS

Search Report for IT210 issued by the European Patent Office dated Mar. 6, 2001;.

* cited by examiner

*Primary Examiner*—Phan T. H. Palmer
(74) *Attorney, Agent, or Firm*—Laurence A. Greenberg; Werner H. Stemer; Gregory L. Mayback

(57) ABSTRACT

A coupling device is for coupling an optical fiber to an optical transmitting or receiving unit. The coupling device can be included in a transmitting or receiving device. The coupling device to be can be one piece, formed of a nonconductive material, and, for the optical transmitting or receiving unit, can be mounted directly on a section projecting like a step or a contact-making face applied thereto. The flattened surface of the section projects like a step and has a longitudinal notch for positioning the transmitting or receiving unit.

29 Claims, 3 Drawing Sheets

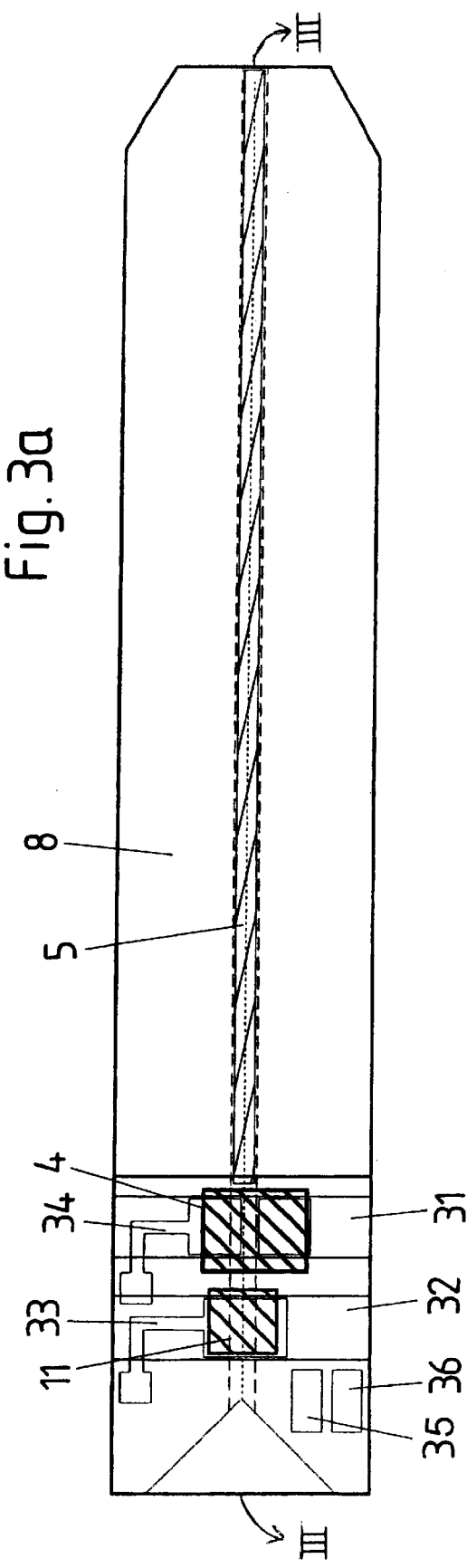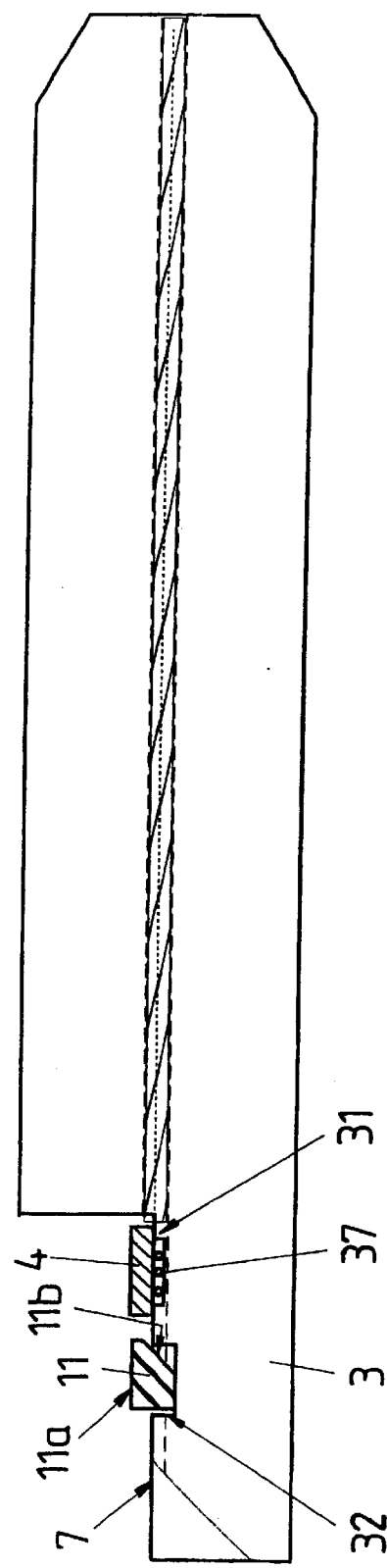

COUPLING DEVICE FOR CONNECTING AN OPTICAL FIBER TO AN OPTICAL TRANSMITTING OR RECEIVING UNIT AND TRANSMITTING OR RECEIVING DEVICE HAVING A COUPLING DEVICE

BACKGROUND OF THE INVENTION

Field of the Invention

The invention relates to a coupling device for connecting an optical fiber to an optical transmitting or receiving unit and transmitting or receiving device having a coupling device. More specifically, the invention relates to a coupling device for coupling an optical fiber to an optical transmitting or receiving unit, in particular a laser diode. The coupling device has a main section with an accommodation opening to accommodate an optical fiber, and a section projecting like a step and having a flattened surface for fixing the transmitting or receiving unit. In addition, the invention relates to a transmitting or receiving unit having such a coupling device.

Janssen (U.S. Pat. No. 4,874,217) discloses a device for coupling a laser chip to an optical fiber. In this case, a hollow cylinder is adjoined by a semi-cylindrical projection that is fixed to it and on whose flattened side there is a plate-like platform to accommodate the laser chip. The optical fiber, whose end section is constructed as a taper, is disposed in a continuous opening in the long side of the hollow cylinder. The hollow cylinder has longitudinal and transverse incisions in the area of the projection, in order to make the latter deformable for adjusting the laser chip. The hollow cylinder and a further external sleeve of the hollow cylinder are made of metal, and the plate-like platform is produced substantially from diamond.

The drawbacks with the known device are a complex construction and the requirement for active adjustment, which is accomplished by deforming the semi-cylindrical projection. Because of the use of a taper at the end of the fiber, the active adjustment has to be conducted in this case with low tolerance. Adjustment errors in the light propagation direction on the order of magnitude of one micrometer (1 $\mu$m) already have the effect of considerable coupling losses in optical fibers having a taper. Separate positioning elements that contribute further to a complicated construction of the known device are necessary for the deformation of the semi-cylindrical projection necessary for the adjustment and for the fixing of an optimum adjustment.

SUMMARY OF THE INVENTION

It is accordingly an object of the invention to provide a coupling device for connecting an optical fiber to an optical transmitting or receiving unit and transmitting or receiving device having a coupling device that overcome the hereinaforementioned disadvantages of the heretofore-known devices of this general type by coupling an optical fiber to a transmitting or receiving unit with a simple construction while being produced cost-effectively and with reduced effort.

With the foregoing and other objects in view, there is provided, in accordance with the invention, a coupling device for coupling an optical fiber to an optical transmitting or receiving unit. The coupling device includes a main section with an accommodation opening for accommodating an optical fiber. A section is formed in one piece with the main section from nonconductive material, projects like a step, and has a flattened surface for directly mounting the transmitting or receiving unit. The optical transmitting or receiving unit projects like a step or a contact-making surface applied to the flattened surface. The flattened surface of the section projects like a step having a longitudinal notch for positioning the transmitting or receiving unit.

Consequently, according to the invention, a single-piece coupling device is provided which includes an electrically insulating material and in which the optical transmitting or receiving unit can be mounted directly on a portion projecting like a step or a contact-making surface applied to the latter.

The elements to be connected with an optical coupling are therefore mounted directly on a single-piece component. Separate components or additional electrical insulators can be omitted. The outlay on material and the overall size of the device are reduced considerably as compared with the prior art.

In addition, the flattened surface of the section projecting like a step has, according to the invention, a longitudinal notch, which is used for positioning the transmitting or receiving unit. The longitudinal notch passively aligns the transmitting or receiving element. Corresponding structures belonging to a transmitting or receiving element engage the longitudinal notch. Appropriate structuring is accomplished, for example, by etching, by grinding or by laser machining.

The passive alignment and centering of the transmitting and receiving component dispenses with the requirement for active adjustment transversely with respect to the longitudinal axis of the device. The transmitting or receiving element to be mounted is positioned automatically when it is placed on the projecting section.

In a preferred embodiment, the flattened surface of the section projecting like a step is located in a plane that intersects the extension of the accommodating opening in the main section. The longitudinal notch represents the continuation of the accommodation opening in the projecting section. The longitudinal axis is therefore produced automatically during the production of the device: it is the remaining part of the continuous accommodation opening in the main section. The material present above the (subsequently) projecting section is removed during the production. In this configuration, the longitudinal notch is produced in a very effective way by using structures that are already present.

In this embodiment, the flattened surface of the section projecting like a step merely must lie in one plane that intersects the extension of the accommodation opening of the main section. In this case, provision may be made for the accommodation opening to be intersected above or below its center. Depending on this, the longitudinal notch has a different width and depth.

In one embodiment, the accommodation opening is intersected not quite at its center, so that the axis of an optical fiber guided in the accommodation opening does not lie in the plane of the surface of the projecting section, which could make coupling light into or out of the optical fiber more difficult, depending on the construction.

In a preferred configuration, the section projecting like a step adjoins the main section rigidly, that is to say substantially without incisions or cutouts. The rigid connection of the section projecting like a step to the main section has the advantage that, after the transmitting or receiving unit has been fixed to the projecting section, there is defined positioning with respect to an optical fiber to be coupled on.

The step-like section preferably forms a vertical stop for the transmitting or receiving element. Positioning in the z-direction as it is placed on the step-like area therefore takes place directly via the surface formed by the step-like section.

In a preferred development of the invention, the section projecting like a step has a structured metallization. The metallization is here structured in as much as only specific structured areas are provided with a metallization, rather than the entire area of the step-like section. In particular, the structured metallization encompasses conductor tracks for making contact with the transmitting or receiving element. The structured metallization is used in particular to make electrical contact with the transmitting or receiving unit. However, it can likewise be used for fixing the transmitting or receiving unit on the projecting section, for example by soldering or bonding.

In a development of the invention, the area projecting like a step has depressions to accommodate fixers and/or contact-makers for the transmitting or receiving element. These depressions are produced, for example, by grinding or milling the projecting section. They mechanically fix the transmitting or receiving unit independently of the step of positioning the transmitting or receiving element.

In this case, for example, a material that performs the joining or fixing of the correctly positioned transmitting or receiving element is introduced into the corresponding depressions.

Furthermore, the depressions can, at least partially, also have contact-makers such as a structured metallization. The fixing of the transmitting or receiving element can in this case, and also in making electrical contact, for example be carried out within the context of using a conductive adhesive or by soldering and adhesive bonding. Reference is made to the fact that any desired types of fixing the transmitting or receiving element are possible.

In an advantageous refinement, a monitor diode can be mounted on the section projecting like a step, in addition to the transmitting or receiving unit. The monitor diode is likewise placed directly on the projecting section or a metallization located on the latter. If necessary, depressions can be provided in the projecting section, said projections bringing the monitor diode into a sunken position and aligning it passively in a desired position. In this case, a preferred exemplary embodiment provides for the optically active face of the monitor diode to point upward. Light to be detected is in this case diffracted in the direction of the optically active face via a bevel.

The accommodation opening for the optical fiber preferably extends through the main section as a continuous longitudinal opening. The end section to be coupled of the optical fiber terminates substantially with the end of the accommodation opening facing the projecting section. In this case, the end of the optical fiber preferably projects from the accommodation opening by a defined distance. This is expedient, for example from the point of view that the edge running between the projecting section and the main section may possibly have a certain rounding, so that it is not possible to position the transmitting or receiving unit directly at the accommodation opening. Otherwise, more defined positioning of the optical fiber is possible if it projects from the accommodation opening by a defined distance.

The coupling device is preferably constructed as a hollow ceramic cylinder. This simplifies the production considerably. Such a ceramic cylinder is a conventional, prefabricated high-precision component and is also used for other purposes. By removing part of the cylinder, it is adapted to be used as a coupling device. In order to form a cylindrical projection, the ceramic cylinder is either ground suitably or undergoes laser machining, in which the removal of material is accomplished in a suitable way.

In one preferred embodiment, the size and shape of the ceramic cylinder corresponds to a normal ferrule for standard optical fiber plugs, as are used in optical communications technology. The further use of the device, for example coupling to an optical plug via a slit sleeve, is simplified considerably, since standard components can be used.

The portion of the coupling device that projects like a step preferably has a semi-cylindrical shape. During the production of the device, it is therefore merely necessary for that part of the cylinder that is located above this section to be removed. This can be done in one operation. The flattened side is in this case produced automatically.

The transmitting or receiving unit according to the invention has an optical transmitting or receiving unit, an optical fiber, and a coupling device having a portion projecting like a step. It permits the coupling of a transmitting or receiving unit, in particular a laser diode, to an optical fiber in a simple way.

In this case, the transmitting or receiving unit preferably has contours on its surface that interact with corresponding contours. That is to say, the longitudinal notch in the section projecting like a step in order to align the transmitting and receiving unit passively. Therefore, no active adjustment of the position of the transmitting or receiving element is required, instead passive positioning of the component is accomplished.

In a preferred embodiment, the optical fiber is disposed at a distance from the transmitting or receiving unit, the optical fiber projecting from the accommodation opening by a defined distance. Optical coupling is preferably completed in this case via an optically transparent, index-matched casting compound. The index-matched casting compound in this case reduces the occurrence of reflections at the end face of the optical fiber. In addition, it provides protection for the configuration against environmental influences.

The end section of the optical fiber adjoining the transmitting or receiving unit is preferably blunt. In this way, it can rest with the entire cross-sectional area on the unit. This configuration can be produced in a straightforward manner, and the coupling losses are kept low.

The transmitting or receiving unit is preferably mounted on the flattened side of the projecting section. In this case, the unit can be positioned easily. The transmitting and receiving unit preferably rests on the edge between the cylindrical section and the projecting section. The edge provides a reference line, which permits simple mounting.

When a laser diode is used as the transmitting or receiving unit, this is preferably rotated through 180° and mounted on the projecting section with the chip surface downward. As a result, the sensitivity with respect to tolerance deviations between the laser channel and the wave guide channel is reduced, since the influence of the chip thickness tolerance is minimized.

The laser diode is preferably constructed as a tapered laser diode, that is to say taper elements are integrated into the laser chip. For this reason, additional taper elements outside the chip, between the laser diode and optical fiber, are dispensed. The use of a tapered laser diode in conjunction with a wave guide end which is butt-coupled permits relatively high tolerance deviations in the alignment of the laser channel and wave guide channel, so that passive alignment of the laser diode on the projecting section of the coupling device is possible without the requirement for active adjustment.

Other features that are considered as characteristic for the invention are set forth in the appended claims.

Although the invention is illustrated and described herein as embodied in a coupling device for connecting an optical fiber to an optical transmitting or receiving unit and transmitting or receiving device having a coupling device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3a is a plan view of a second embodiment of a coupling device; and

FIG. 3b is a longitudinal section taken along a line III–III in FIG. 3a.

DESCRIPTION OF THE PREFERRED EMBODIMENTS

Figure 1:
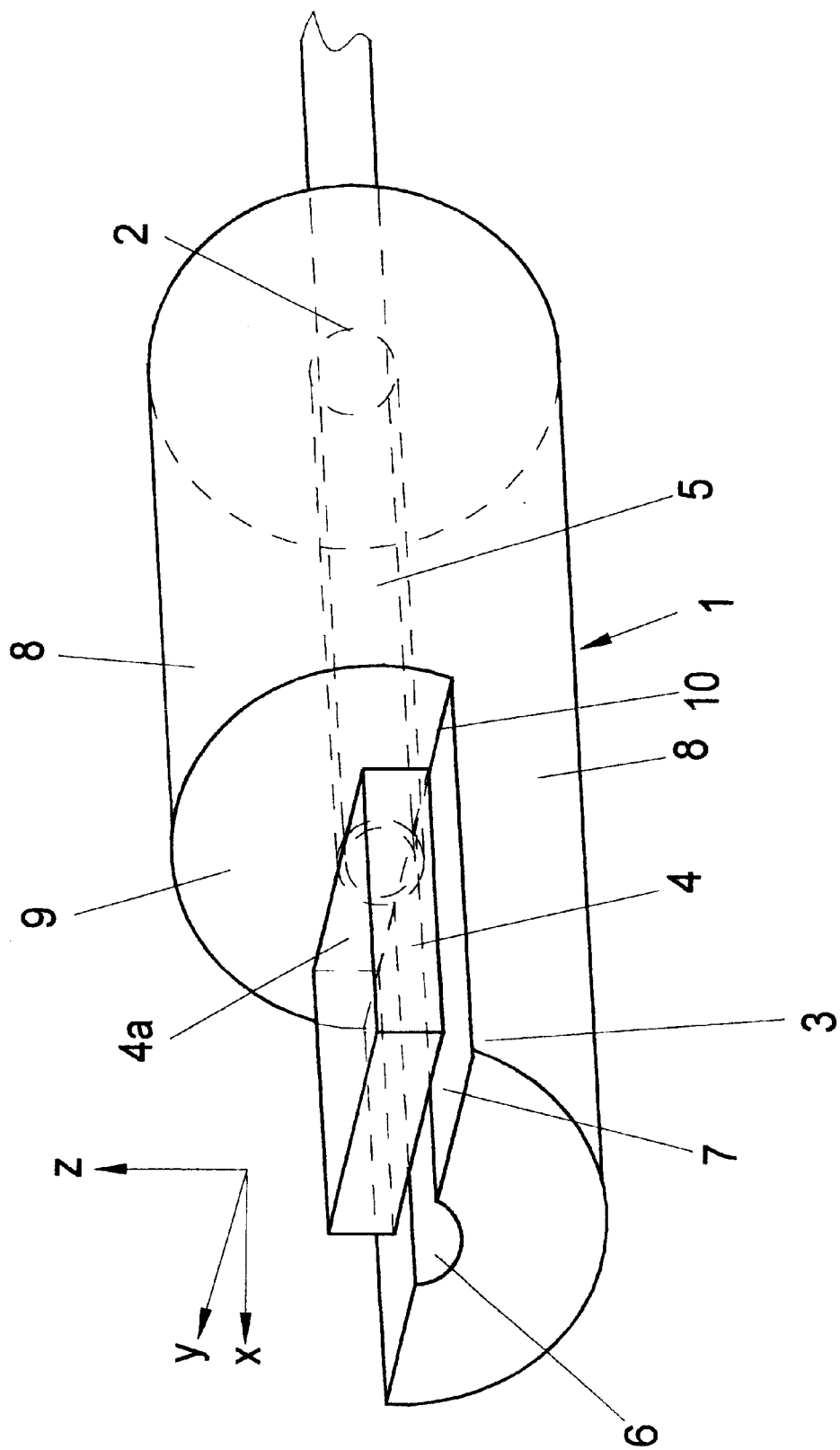
FIG. 1 is a diagrammatic perspective view showing a first embodiment of the coupling device.

Referring now to the figures of the drawings in detail and first, particularly to FIG. 1 thereof, there is shown a transmitting or receiving diode having a coupling device 1 for coupling a transmitting or receiving unit 4, for example a laser diode, to an optical fiber 5. The coupling device 1 has a main section 8 that is constructed as a hollow ceramic cylinder. Along it s longitudinal axis, in a central configuration, the main section 8 has a cylindrical accommodation opening 2 for the optical fiber 5.

The main section 8 is adjoined in one piece by a semicylindrical, projecting section (projection) 3, whose surface 7 running along the longitudinal axis is flattened. A partcylindrical groove or longitudinal notch 6 runs along this surface 7. It is the continuation of the accommodation opening 2 of the main section 8. The surface 7 intersects the longitudinal notch 6, that is to say the continuation of the accommodation opening 2, in a plane that lies off-center with respect to the accommodation opening 2. A desired width and depth of the longitudinal notch 6 can be set depending on the sectional plane.

The sectional face 9 of the main section 8, running transversely with respect to the longitudinal axis, is semicircular.

The main section 8 and the projecting section 3 are formed in one piece. In this case, the projecting section 3 adjoins the main section 8 rigidly, that is to say in the transitional area, no holes, cutouts, etc. are provided, which would lead to the flexible attachment of the projecting section 3 to the main section 8.

The coupling device 1 is produced from a conventional cylindrical ferrule for optical fiber plugs. An end section of such a ferrule is in this case removed by grinding or laser machining in order to form the projecting section 3.

The optical fiber 5 is located in the accommodation opening 2 of the main section 8. It ends bluntly at that end of the accommodation opening 2, which is located at the sectional face 9 or, preferably, at a short, defined distance behind the sectional face 9. The laser diode 4, whose light is to be coupled into the optical fiber, is disposed on the surface 7. Its one end face 4a adjoins the sectional face 9 and therefore the blunt end of the optical fiber 2. In this case, a small distance is preferably provided between the end face 4a of the laser diode 4 and the sectional face, into which distance the blunt end of the optical fiber 5 projects.

The laser chip 4 is positioned on the surface 7 of the section 3 without active adjustment. Adjustment in the vertical direction (z-direction) is dispensed with, in as much as the surface 7 of the projecting section 3 constitutes a vertical stop, and the laser chip 4 is placed directly on the surface 7 or a contact-maker located thereon.

Adjustment of the laser chip 4 in the longitudinal direction (x-direction) is dispensed because the laser chip merely must be brought up against the sectional face 9. Positioning in the transverse direction (y-direction) is likewise accomplished without active adjustment, by a corresponding projection in the laser chip engaging in the longitudinal groove 4 in the section 3, as will be explained in more detail with reference to FIG. 2.

For the purpose of passive alignment and positioning of the laser chip 4, further positioners can be provided, in particular depressions in the surface 7 of the projecting section 3 which cooperate with corresponding structures on the laser chip 4.

The laser diode 4 is of tapered construction. In conjunction with the blunt construction of the end of the optical fiber 5, this leads to optical coupling between the optical fiber 5 and the laser diode 4 which is relatively insensitive to tolerances, in particular permits tolerances around about one micrometer (1 $\mu$m). The provided passive alignment of the laser diode 4 is therefore sufficiently accurate. In this case, it is important that the projecting section 3 adjoins the main section 8 rigidly, so that maladjustment arising from deformation of the projecting section 3 cannot take place.

After the laser diode has been positioned, it is fixed and contact is made with it. This will be explained in more detail using FIGS. 3a, 3b.

The entire configuration, in particular the area between laser diode 4 and optical fiber 5, is preferably encapsulated with a non-illustrated index-matched casting compound, which reduces reflections at the end face of the optical fiber 5 when coupling in light and provides protection against dirt and environmental influences.

Figure 2:
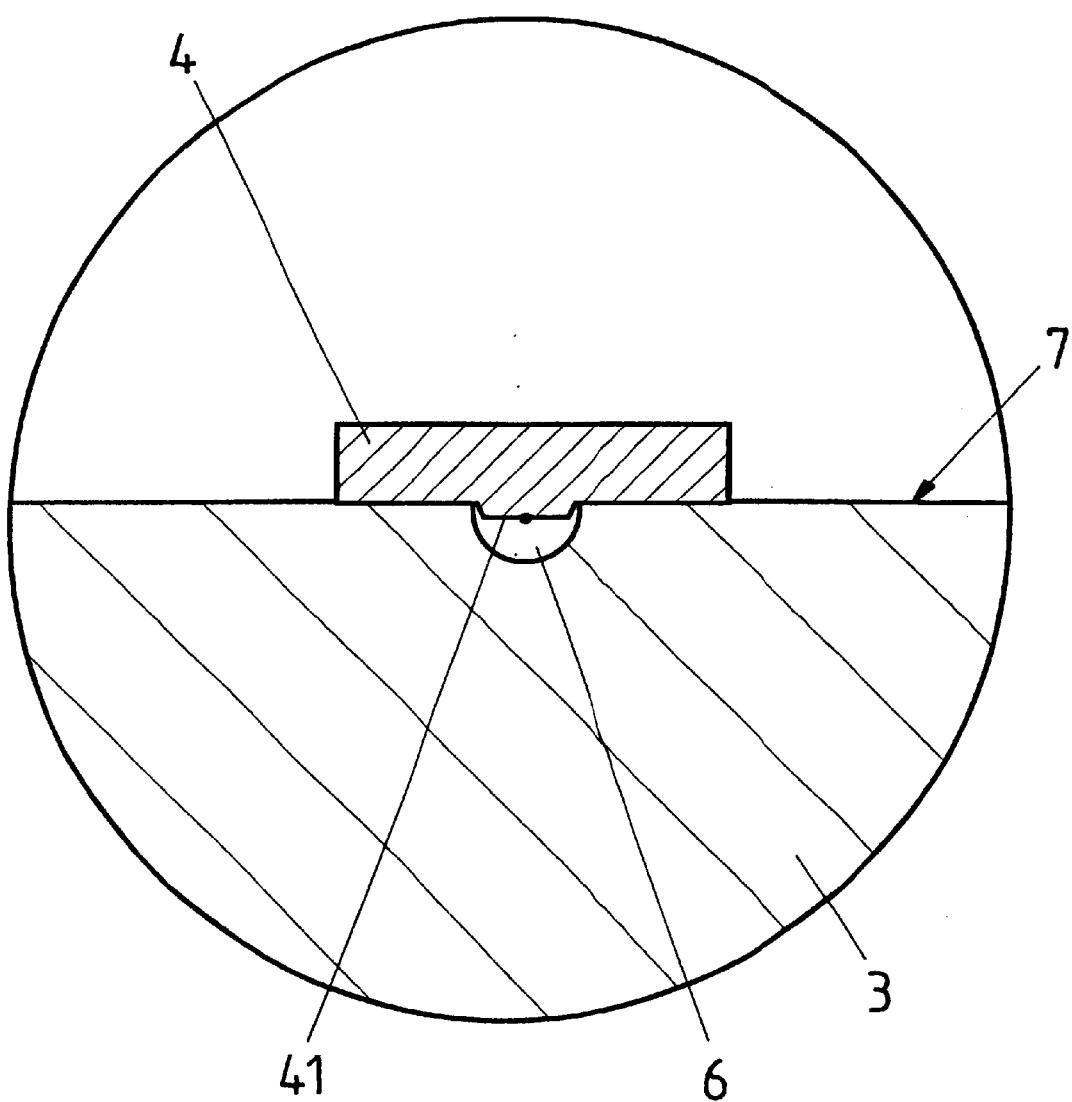
FIG. 2 is a front view showing the first embodiment of the coupling device.

The embodiment of FIG. 2 shows the positioning and desired alignment of the laser diode 4 in the transverse direction (y-direction). To this end, a projection 41 with lateral edges is formed on the underside of the laser diode 4 and engages in the longitudinal groove 6 in the projecting section 3. The projection 41 is produced in a highly precise manner by etching, for example during the production of the laser diode. The form-locking connection between the projection 41 and the longitudinal groove 6 provides highly accurate positioning in the transverse direction. A formlocking connection is one that connects two elements together due to the shape of the elements themselves, as opposed to a force-locking connection, which locks the elements together by force external to the elements.

A non-illustrated metallization can be provided between the underside of the laser diode 4 and the surface 7 of the projecting section 3 to make contact with the laser diode 4. Contact is then preferably made with the upper side of the laser diode 4, in a manner known per se, by a bonding wire (not illustrated).

In the exemplary embodiment of FIGS. 3a, 3b, two transverse grooves 31, 32, which serve to make contact with and fix the laser diode 5 and an additional monitor diode 11, are formed in the surface 7 of the projecting section 3. A structured metallization in the form of conductor tracks 33, 34 runs partially in the transverse grooves 31, 32. The conductor tracks 33, 34 are used to make contact with the lower connection of the laser diode 4 and the monitor diode 11. Contact is in each case made with the upper connection by a bonding wire (not illustrated), which is routed to a connecting pad 35, 36 on the upper side of the projecting section 7.

In the illustrated exemplary embodiment, the laser diode 4 is disposed with the upper side downward, that is to say, the laser channel is disposed close to the surface 7 of the projecting section 3. This reduces the influence of thickness tolerances on the laser chip 4 on the adjustment.

The monitor diode 11 is disposed in such a way that its optically active area 11a is located at the top. Light detected by the laser diode 4 is diffracted in the direction of the optically active area 11a by a beveled face 11b facing the laser diode 4.

After the laser diode 4 has been aligned, it is fixed by fixers introduced into the transverse groove 31. Here, these are, for example, bumps 37, as they are known (cf. FIG. 3b), with which the laser diode 4 is fixed in the transverse groove 31. Further possible fixers include, for example, conductive adhesive bonding on the conductor track 34 or other adhesive bonding methods. In this case, the transverse grooves permit the requisite fixers to be separated from the aligners of the laser diode (for example the transverse groove 6).

In FIG. 3b, the blunt end face of the glass fiber 5 projects somewhat from the accommodation opening in the main section 8.

The laser diode 4 rests on the transverse groove 31 at the sides, that is to say the vertical stop for the laser diode 4 is formed by the surface 7 of the projecting section 3.

Furthermore, reference is made to the fact that the embodiment of FIGS. 3a, 3b is preferably combined with the embodiment of FIG. 2. Thus, the transverse grooves 31, 32 or other depressions are used for fixing the transmitting or receiving unit 4, while contours such as the longitudinal groove 6 are used for positioning the transmitting or receiving module 4. Appropriate structures are preferably formed at the same time on the projecting section.

We claim:

1. A coupling device for coupling an optical fiber to an optical transmitting or receiving unit, the coupling device comprising:
    a main section with an accommodation opening for accommodating an optical fiber;
    another section being formed in one piece with said main section from nonconductive material, projecting like a step, and having a flattened surface for mounting the transmitting or receiving unit, said flattened surface supporting the optical transmitting or receiving unit and having a longitudinal notch for positioning the transmitting or receiving unit.

2. The coupling device according to claim 1, wherein said main section and said other section are a hollow, single-piece ceramic cylinder.

3. The coupling device according to claim 2, wherein said hollow ceramic cylinder forms a ferrule.

4. The coupling device according to claim 2, wherein said other section is semi-cylindrical with a flattened upper side.

5. The coupling device according to claim 1, wherein said flattened surface of said other section projects like a step lying in a plane intersecting an extension of said accommodation opening of said main section, said longitudinal notch continuing said accommodation opening in said other section.

6. The coupling device according to claim 5, wherein said flattened surface of said other section intersects the extension of said accommodation opening and said flattened surface is off-center from the extension of said accommodation opening.

7. The coupling device according to claim 1, wherein said main section forms a vertical stop for the transmitting or receiving element.

8. The coupling device according to claim 1, wherein said other section has a structured metallization.

9. The coupling device according to claim 8, wherein said structured metallization includes conductor tracks for making contact with the transmitting or receiving element.

10. The coupling device according to claim 1, wherein said other section has depressions to accommodate fixers of the transmitting or receiving element.

11. The coupling device according to claim 1, wherein said section projecting like a step has depressions to accommodate contact-makers of the transmitting or receiving element.

12. The coupling device according to claim 1, wherein said section projecting like a step is additionally for supporting a monitor diode.

13. The coupling device according to claim 1, wherein said accommodation opening for accommodating the optical fiber is a continuous longitudinal opening through said main section.

14. The coupling device according to claim 1, wherein said flattened surface directly supports the optical transmitting or receiving unit.

15. The coupling device according to claim 1, including a contact-making surface applied on said flattened surface for supporting the optical transmitting or receiving unit.

16. The coupling device according to claim 1, wherein said other section rigidly adjoins said main section.

17. The coupling device according to claim 1, wherein the optical transmitting or receiving unit is a laser diode.

18. A transmitting or receiving device, comprising:
    an optical transmitting or receiving unit;
    an optical fiber; and
    a coupling device including:
        a main section with an accommodation opening accommodating said optical fiber;
        another section being formed in one piece with said main section from nonconductive material, projecting like a step, and having a flattened surface supporting said transmitting or receiving unit, said flattened surface of having a longitudinal notch for positioning said transmitting or receiving unit.

19. The transmitting or receiving device according to claim 18, wherein said optical transmitting or receiving unit is a laser diode.

20. The transmitting or receiving device according to claim 19, wherein said laser diode has a top mounted downward.

21. The transmitting or receiving device according to claim 19, wherein said laser diode is a tapered laser diode.

22. The transmitting or receiving device according to claim 18, including an optically transparent, index-matched casting compound optically connecting said optical fiber and said transmitting or receiving unit.

23. The transmitting or receiving device according to claim 18, wherein said optical fiber has a blunt end section coupled to said optical transmitting or receiving unit.

24. The transmitting or receiving device according to claim 18, wherein an end section of said optical fiber projects from said main section toward said other section by a defined distance.

25. The transmitting or receiving device according to claim 18, wherein said transmitting or receiving unit rests on an edge formed by a sectional face of said main section and said other section.

26. The transmitting or receiving device according to claim 18, wherein said flattened surface directly supports said optical transmitting or receiving unit.

27. The transmitting or receiving device according to claim 18, including a contact-making surface applied to said flattened surface directly supporting said transmitting or receiving unit.

28. The transmitting or receiving device according to claim 18, wherein said transmitting or receiving unit has contours engaging said longitudinal notch passively aligning said transmitting and receiving unit in said longitudinal notch.

29. The transmitting or receiving device according to claim 18, including a monitor diode mounted on said other section.

* * * * *